US008063155B2

(12) United States Patent
Aubert

(10) Patent No.: US 8,063,155 B2
(45) Date of Patent: Nov. 22, 2011

(54) CURING AGENT WHICH IS SUITABLE FOR EPDM-TYPE RUBBERS

(75) Inventor: Thierry Aubert, Pau (FR)

(73) Assignee: Arkema France, Colombes (FR)

( * ) Notice: Subject to any disclaimer, the term of this patent is extended or adjusted under 35 U.S.C. 154(b) by 715 days.

(21) Appl. No.: 10/575,597

(22) PCT Filed: Oct. 7, 2004

(86) PCT No.: PCT/FR2004/002526
§ 371 (c)(1),
(2), (4) Date: Apr. 13, 2006

(87) PCT Pub. No.: WO2005/037910
PCT Pub. Date: Apr. 28, 2005

(65) Prior Publication Data
US 2007/0142567 A1    Jun. 21, 2007

(30) Foreign Application Priority Data
Oct. 15, 2003   (FR) ..................... 03 12022

(51) Int. Cl.
*C08C 19/20*      (2006.01)
(52) U.S. Cl. .................. 525/343; 525/331.9; 525/332.5; 525/332.6; 525/333.3; 525/333.5; 525/374; 525/382; 252/182.11; 252/182.13; 252/182.17; 568/21; 568/25
(58) Field of Classification Search ............... 525/333.7, 525/333.9, 343, 379, 384, 535
See application file for complete search history.

(56) References Cited

U.S. PATENT DOCUMENTS

| 2,422,156 | A |   | 6/1947 | Wolf et al. |         |
|-----------|---|---|--------|-------------|---------|
| 3,968,062 | A | * | 7/1976 | Ecsedy      | 525/189 |
| 5,096,978 | A | * | 3/1992 | Coran       | 525/346 |
| 5,326,828 | A | * | 7/1994 | Rowland et al. | 525/346 |

FOREIGN PATENT DOCUMENTS

DE         247016       6/1987

OTHER PUBLICATIONS

Graf, H.-J.: "Praxisrelevante Strategien zur Vermeidung gefahrlicher N-Nitrosamine bei der Vulkanisation von Elastomeren" Kautschuk Gummi Kunststoffe, vol. 46, No. 6, 1993, pp. 486-491, XP0001181230 le document en entier.
Laffitte, J. A.; Lugez, P.: Nouvel agent de couplage silice-SBR Caoutchoucs and Plastiques, vol. 816, Oct. 1, 2003, pp. 48-53, XP001181167 le document en entier.

* cited by examiner

*Primary Examiner* — Vasu Jagannathan
*Assistant Examiner* — Robert C Boyle
(74) *Attorney, Agent, or Firm* — Steven D. Boyd

(57) ABSTRACT

The invention relates to a sulphur donor curing agent comprising a combination of between 10 and 90 wt % of a mixture of polysulphides of poly(alkyl phenol) and between 90 and 10 wt. % a compound of the formula R'NHCONHR" were R' and R" are the same or different and are hydrogen oa an alkyl or aryl radical having 1 to 20 carbon atoms and methods of curing an EPDM-type rubber elastomer with the composition which presents no risk of the formation of nitrosamines.

5 Claims, No Drawings

CURING AGENT WHICH IS SUITABLE FOR EPDM-TYPE RUBBERS

FIELD OF THE INVENTION

The subject of the present invention is a novel vulcanizing agent based on poly(alkylphenol) polysulfides that can be used in the field of rubbers of the EPDM type. It also relates to a vulcanizing method employing it which does not present a risk relative to nitrosamines.

BACKGROUND OF THE INVENTION

Poly(alkylphenol) polysulfides, known under the name Vultac®, are vulcanizing agents that are widely used in the rubber industry as sulfur donors. This latter expression is intended to denote, in the field of rubbers, a compound (or mixture of chemical compounds) that is capable of liberating sulfur by heating at the vulcanization temperature, so as to cross-link rubbers or elastomers which contain double bonds in their main or side chain. Poly(alkylphenol) polysulfides indeed contribute both to the satisfactory progress of the vulcanization reaction and to the mechanical properties of vulcanized articles manufactured from natural rubber, synthetic rubbers of the SBR (Styrene Butadiene Rubber) type or chlorobutyl rubbers or mixtures thereof. One of their most valued advantages is that they do not possess nitrogen or an amine group, and consequently cannot generate nitrosamines or contribute to their formation.

In the field of rubber, the presence of nitrosamines has in point of fact been recognized for a long time as a serious hazard for health, both for persons who work in manufacturing units and for users or consumers who are in contact with vulcanized articles after forming. This is why the rubber industry is continually striving to eliminate or limit emissions of nitrosamines and chemical products that are capable of generating these. Rubbers of the EPDM (Ethylene Propylene Diene Monomer) type are obtained by copolymerization of ethylene, propylene and a dienic monomer. They come within the field of industrial rubbers, and are particularly used, after vulcanization, in the manufacture of profiled sections for the automobile industry or for building. These sections are widely used for their mechanical properties, their impermeability qualities and their ageing resistance. Mention may be made, for example in the automotive field, of profiled sections which provide a seal between the glass and the metal part of the door and, in the building construction field, glazing seals.

Consideration has been given to the incorporation of poly(alkylphenol) polysulfides during vulcanization of rubbers of the EPDM type. It has however encountered an undesirable effect concerning vulcanization kinetics. It in point of fact brings about an appreciable increase in the duration of the vulcanization reaction. Now, this duration is a critical parameter which governs productivity in the manufacture of articles made of rubber of the EPDM type for manufacturers of this sector.

Only a few sulfur-donor vulcanizing agents that do not present a risk relative to nitrosamines have been proposed for cross-linking elastomers of the EPDM type. Thus, mention may be made of compounds belonging to the dithiolactam family, such as dithiodicaprolactam, to the family of polythiophosphates, such as bis(O,O-2-ethylhexylthiophosphoryl polysulfide or to the family of polysulfide xanthates.

However, it is always desirable to widen the range of sulfur-donor vulcanizing agents that are provided in the field of the development of industrial rubbers (in particular EPDMs) so that specialists in this field can produce complex formulations that make it possible to achieve optimization of the mechanical properties required for vulcanizates, while obtaining a vulcanization time compatible with the productivity requirements of manufacturing units.

SUMMARY OF THE INVENTION

A novel sulfur-donor vulcanizing agent based on poly(alkylphenol) polysulfides has at present been found which does not present a risk relative to the formation of nitrosamines, and moreover remedies the disadvantage mentioned above relating to the undesirable extension of the vulcanization time of vulcanizable compositions based on EPDM.

The subject of the present invention is therefore a sulfur-donor vulcanizing agent comprising the combination of:

10 to 90% of a product (I) consisting of a mixture of poly(alkylphenol) polysulfides of formula:

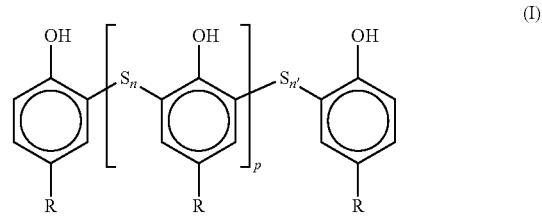

(I)

in which:
R is an alkyl radical having 1 to 20 carbon atoms,
n and n' are two integers that are identical or different, each being greater than or equal to 1 and less than or equal to 8,
p is an integer between 0 and 50, and
from 10 to 90% of a compound of formula (II)

R'NHCONHR"    (II)

in which R' and R", that are identical or different, each represent a hydrogen atom or an alkyl or aryl radical having 1 to 20 carbon atoms.

DETAILED DESCRIPTION OF THE INVENTION

The percentages indicated above and in all the present text are, in the absence of contrary indications, percentages by weight.

It has in point of fact been found that the incorporation of the compound (II) in a vulcanizable composition based on EPDM elastomer makes it possible for the combination according to the invention to have a vulcanization time that, surprisingly, is considerably reduced compared with that resulting from the incorporation of the product (I) alone.

In the combination according to the invention, it is preferred to use a product of formula (I) in which R is an alkyl radical having 4 to 10 carbon atoms, n and n' are each greater than or equal to 1 and less than or equal to 4, and p is an integer between 0 and 20.

According to another preferred variant, a compound of formula (II) is used in which R' and R" represent an alkyl radical having 1 to 3 carbon atoms.

According to a more particularly preferred embodiment, the radicals R' and R" of formula (II) represent a hydrogen atom, compound II then being urea.

Poly(alkylphenol) polysulfides of formula (I) have been known for a long time and are in particular marketed by Atofina under the name of Vultac®. They can be prepared by reacting sulfur monochloride or dichloride with an alkylphenol, at a temperature between 100 and 200° C., according to the following reaction:

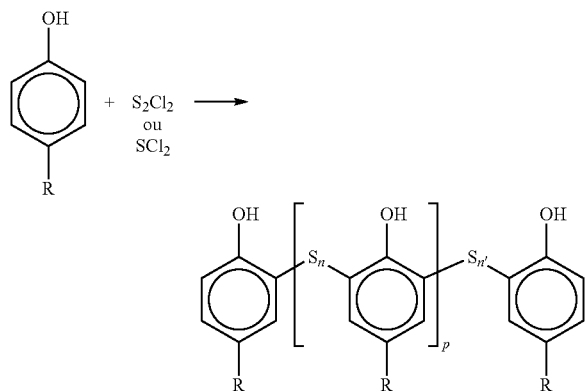

Mention may be made, as a reference to the manufacture of these products, of patents U.S. Pat. Nos. 2,422,156 and 3,968,062.

According to another preferred variant of the invention, a mixture is used of compounds of formula (I) in which R is an alkyl radical having at least one tertiary carbon by which R is linked to the aromatic nucleus.

According to an even more preferred variant, R is a tertio-butyl or tertio-pentyl radical.

As the mixture of compounds of formula (I), use is even more particularly made of a mixture in which the average value of n and n' is approximately 2, and the average value of p is approximately 5. These average values are calculated by a person skilled in the art from proton NMR data and by gravimetric analysis for sulfur.

The combination of product (I) and compound (II) is prepared simply by physically mixing (I) and (II) intimately in the powdered state.

The present invention also relates to a method for vulcanizing an elastomeric composition of the EPDM type presenting no risk relative to nitrosamines, comprising the incorporation of an effective quantity of the vulcanizing agent according to the invention in the vulcanizable elastomeric composition.

An elastomeric composition of the EPDM type is understood to denote the use as an elastomer of a terpolymer comprising structural units derived from ethylene, propylene and a dienic monomer. The latter may be:

- a conjugated diene such as isoprene or 1,3-butadiene;
- an unconjugated diene having 5 to 25 carbon atoms, such as 1,4-pentadiene, 1,4-hexadiene, 1,5-hexadiene, 2,5-dimethyl-1,5-hexadiene, or 1,4-octadiene;
- a cyclic diene such as cyclopentadiene, cyclohexadiene, cyclooctadiene or dicyclopentadiene; or
- an alkylidenenorbornene or an alkenylnorbornene such as 5-ethylidene-2-norbornene, 5-butylidene-2-norbornene, 2-methyl-allyl-5-norbornene, 2-isopropenyl-5-norbornene.

These terpolymers generally comprise 30 to 80% by weight of structural units derived from ethylene and a content of structural units derived from propylene corresponding to a weight ratio of structural units derived from ethylene/structural units derived from propylene of between 0.5 and 3. The dienic monomer content generally lies between 0.5 and 12% by weight.

The vulcanizable elastomeric composition employed in the method according to the invention may incorporate, as the elastomer, one or more terpolymers as previously defined.

A terpolymer of ethylene, propylene and ethylidene norbornene is more especially preferred.

Other than the EPDM-type elastomer, the vulcanizable composition employed in the method according to the invention also includes one or more vulcanization accelerators that do not present a risk relative to nitrosamines. Mention may be made in particular of compounds belonging to the family of metallic dithiophosphates, such as zinc dialkyldithiophosphates, to the family of sulfenamides derived from benzothiazole, such as N-cyclohexyl-2-benzothiazolesulfenamide and to the family of dithiocarbamates such as zinc dibenzyldithiocarbamate. The latter is derived from dibenzylamine, the corresponding nitrosamine of which is not volatile and therefore presents a limited risk and, on account of this, has been classified as non-hazardous.

The vulcanizable composition employed, finally includes the usual additives such as a reinforcing filler, like carbon black, paraffin oil and vulcanization activators such as zinc oxide or stearin.

The quantity of vulcanizing agent according to the invention that is incorporated in the vulcanizable composition described previously varies according to the nature and quantity of the other additives and may be conveniently determined by a person skilled in the art by means of systematic tests. In general, a dose of between 0.4 and 6 parts by weight, preferably between 0.8 and 3 parts by weight, per 100 parts by weight of elastomer is appropriate.

After incorporating the previously described additives as well as sulfur in the vulcanizable composition, the vulcanizable composition is, after forming (for example by molding or extrusion), vulcanized by any means known to a person skilled in the art, such as simply by heating.

The present invention is illustrated in a non-limiting way by the following examples.

In these examples, use is made, as product (I), of a mixture of compounds of formula (I) in which R is a tertio-butyl radical, the average value of n and of n' is approximately 2, and the average value of p is approximately 5. This product is available under the name Vultac TB7® from Atofina. The product (II) used is urea.

EXAMPLES

Example 1

Vulcanizing agent comprising 80% of Vultac TB7® and 20% urea.

The vulcanizing agent was prepared by simply mixing the product (I) and the compound of formula (II) in the powdered state.

Example 2

Vulcanizable composition comprising the vulcanizing agent of example 1 and a terpolymer of ethylene, propylene and ethylidene norbornene.

2.1. Preparation of the Composition:

In a first step, a masterbatch was prepared comprising the elastomer, the reinforcing filler and non-sulfur-based additives. Mixing was simply carried out at ambient temperature in a 2 liter internal mixer of the Banbury type rotating at 25 revolutions/minute.

The concentration of the different ingredients used for preparing the masterbatch is given in table (A) below. This concentration is expressed in grams.

TABLE (A)

| Ingredient | Characteristic | Content (g) |
|---|---|---|
| Terpolymer of ethylene (64%), propylene (27.5%), ethylidene norbornene (8.5%) | (1) | 60 |
| Terpolymer of ethylene (67%), propylene (28.5%), ethylidene norbornene (4.5%) | (2) | 70 |
| Carbon black | (3) | 80 |
| Chalk | (4) | 70 |
| Paraffin oil | (5) | 50 |
| Zinc oxide | (6) | 5 |
| Stearic acid | (7) | 1 |
| TOTAL | | 336 |

The characteristics of the ingredients used are as follows:
(1) cerpolymer sold under the trade name EPDM Keltan ® 509*100 by DSM Elastomers.
(2) terpolymer sold under the trade name EPDM Keltan ® 578 by DSM Elastomers.
(3) sold under the trade name N660 by Cabot
(4) non-reinforcing filler
(5) sold under the trade name Flexon 876 by Esso
(6) and (7) vulcanization activators.

In a second step, the masterbatch of table (A) was transferred to a cylinder mixer and brought to a temperature of 45° C. The vulcanizable composition was then prepared by the successive incorporation of sulfur followed by the ingredients indicated in table (B) below:

TABLE (B)

| Ingredient | Characteristic | Content (g) |
|---|---|---|
| Masterbatch of table (A) | | 336 |
| Mixture with 80% sulfur | (8) | 0.5 |
| Mixture with 80% 2-mercaptobenzothiazole | (9) | 1.5 |
| Mixture with 70% zinc dibenzyldithiocarbamate | (10) | 3.15 |
| Vultac ® TB7/urea: 80/20% (vulcanizing agent of example 1) | | 1.5 |

The characteristics of the ingredients used are as follows:
(8) Product sold by MLPC under the name S 80 GA F500, containing 80% sulfur and approximately 20% elastomer.
(9) Vulcanization accelerator not generating nitrosamine sold by MLPC under the trade name MBT 80 GA F500 U, containing 80% 2-mercaptobenzothiazole and approximately 20% elastomer.
(10) Vulcanization accelerator that is non-toxic since it generates a non-volatile nitrosamine, sold by MLPC under the trade name of ZBEC 70 GA F100, containing 70% zinc dibenzyldithiocarbamate and approximately 30% elastomer.

2.2. Determination of t90 by Rheometry:

t90 is the time, expressed in minutes, corresponding to 90% complete vulcanization. It represents the duration of the vulcanization reaction.

This time was determined with the aid of an oscillating disk rheometer in accordance with French standard NF T 43-015. According to this standard, a rubber specimen is thus compressed in a sealed chamber and held at a constant temperature (fixed at 180° C. under the test conditions). A biconical disk is immersed in the sample and oscillates with a small amplitude. This action exerts a shear force on the specimen and the torque necessary for the disk to oscillate depends on the rigidity (shear modulus) of the rubber, this increasing when the vulcanization reaction commences. The development of the torque with time is then recorded as a function of time.

t90 is determined in this way by the time corresponding to 90% of the highest torque obtained at the end of recording which corresponds to the completion of vulcanization.

The result for t90 relating to the vulcanizable composition is indicated in table (C) below.

Example 3 (Comparative)

Example 2 was repeated, incorporating 1.2 g of Vultac® TB7 in place of 1.5 g of the Vultac® TB7/urea mixture.
The result for t90 is indicated in table (C).

Example 4 (Comparative)

Example 2 was repeated, incorporating 0.3 g of urea in place of 1.5 g of the Vultac® TB7/urea mixture.
The result for t90 is indicated in table (C) below.

TABLE (C)

| Vulcanizable composition | Example 2 (Vultac ® TB7/urea: 80/20%) | Example 3 (comparative) (Vultac ® TB7) | Example 4 (comparative) (Urea) |
|---|---|---|---|
| t90 (minutes) | 3.83 | 6.02 | 5.15 |

This table shows that the values of t90 for the vulcanizable composition corresponding to Vultac ® TB7 and to urea are unacceptable for rubber manufacturers. On the other hand, t90 is considerably reduced due to the Vultac ® TB7/urea combination. The vulcanization time of example 2 is therefore compatible with required productivity constraints in units for manufacturing vulcanized articles based on EPDM.

Example 5

Vulcanizing agent comprising 50% Vultac® TB7 and 50% urea.
This agent was prepared by repeating the preparative procedure of example 1.

Example 6

Vulcanizable composition comprising the vulcanizing agent of example 5 and a terpolymer of ethylene, propylene and ethylidene norbornene.

6.1 Preparation of the Composition:

The procedure was as in example 2 for preparing 286 g of a masterbatch of which the concentration of ingredients is indicated in grams in table (D) below:

TABLE (D)

| Ingredient | Characteristic | Content (g) |
|---|---|---|
| Terpolymer of ethylene (48.59%), propylene (42.41%), ethylidene norbornene (9%) | (11) | 100 |
| Zinc oxide | (12) | 5 |
| Stearic acid | (13) | 1 |
| Carbon black | (14) | 70 |
| Carbon black | (15) | 40 |
| Paraffin oil | (5) | 70 |
| TOTAL | | 286 |

The characteristics of the ingredients used are as follows:
(11) terpolymer sold under the trade name EPDM Keltan ® 4903Z by DSM Elastomers.
(12) and (13) vulcanization activators
(14) sold under the trade name N550 by Cabot
(15) sold under the trade name N770 by Cabot As in example 2, vulcanizable compositions were prepared from this masterbatch, consisting of the ingredients indicated in table (E) below:

TABLE (E)

| Ingredient | Characteristic | Content (g) |
|---|---|---|
| Masterbatch of table (C) | | 286 |
| Mixture with 80% sulfur | (8) | 0.5 |
| Mixture with 80% 2-mercaptobenzothiazole | (9) | 1.5 |
| Mixture with 80% N-cyclohexyl-2-benzothiazylsulfenamide | (16) | 1 |
| Mixture with 50% zinc dialkyldithiophosphate | (17) | 4.4 |
| Vultac ® TB7/urea: 50/50 (vulcanizing agent of example 5) | | 1.5 | with:
(16) Vulcanization accelerator not generating nitrosamine sold by MLPC under the trade name CBS 80 GA F500 U, containing 80% N-cyclohexyl-2-benzothiazyl-sulfenamide and approximately 20% elastomer.
(17) Vulcanization accelerator not generating nitrosamine sold by MLPC under the trade name ZDTP 50 GA F500, containing 50% zinc dialkyldithiophosphate and approximately 50% elastomer.

6.2 Measurement of t90:

Proceeding as in example 2, the result indicated in table (F) below was obtained.

Example 7

Vulcanizable composition comprising the vulcanizing agent of example 1 and a terpolymer of ethylene, propylene and ethylidene norbornene.

Example 6 was repeated incorporating, in place of the vulcanizing agent of example 5, that of example 1.

The t90 indicated in table (F) below was obtained:

TABLE (F)

| Vulcanizable composition | Example 6 (Vultac ® TB7/urea: 50/50%) | Example 7 (Vultac ® TB7/urea: 80/20%) |
|---|---|---|
| t90 (in minutes and seconds) | 1 min 11 s | 1 min 39 s |

The combination Vultac ® TB7/urea: 50/50% led to a vulcanization time that was advantageously lowered still further in relation to that obtained with the combination Vultac ® TB7/urea: 80/20%.

The invention claimed is:

1. A sulfur-donor vulcanizing agent consisting of the combination of:
   10 to 90% by weight of a product (I) consisting of a mixture of poly(alkylphenol) polysulfides of formula:

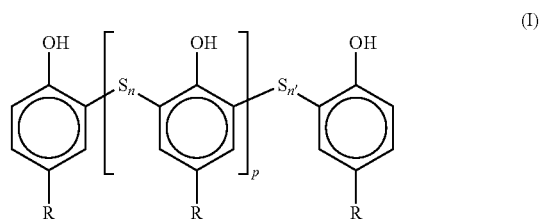

(I)

in which:
   R is a tertio-butyl radical or tertio-pentyl radical, the average value of n and n' is approximately 2, and the average value of p is approximately 5, and
   from 10 to 90% by weight of unsubstituted urea.

2. A method for vulcanizing a vulcanizable elastomeric composition of the EPDM type presenting no risk relative to formation of nitrosamines, comprising the incorporation of an effective quantity of the vulcanizing agent as claimed in claim 1 in the vulcanizable elastomeric composition.

3. The vulcanization method as claimed in claim 2, characterized in that the elastomeric composition incorporates as an elastomer one or more terpolymers of ethylene, propylene and ethylidene norbornene.

4. The vulcanization method as claimed in claim 2, characterized in that the effective quantity of vulcanizing agent is between 0.4 and 6 parts by weight, per 100 parts by weight of elastomer.

5. The vulcanization method as claimed in claim 2, characterized in that the effective quantity of vulcanizing agent is between 0.8 and 3 parts by weight per 100 parts by weight of elastomer.

* * * * *